US008168348B2

(12) United States Patent  
Jang et al.

(10) Patent No.: US 8,168,348 B2
(45) Date of Patent: May 1, 2012

(54) PROCESS FOR THE ELECTROCHEMICAL CATALYSTS OF FUEL CELLS BASED ON POLYMER ELECTROLYTES

(75) Inventors: Byungchul Jang, Daejeon (KR); Youngsu Jiong, Daejeon (KR); Youngtaek Kim, Seoul (KR)

(73) Assignee: Hanwha Chemical Corporation, Seoul (KR)

( * ) Notice: Subject to any disclaimer, the term of this patent is extended or adjusted under 35 U.S.C. 154(b) by 886 days.

(21) Appl. No.: 12/282,087

(22) PCT Filed: Dec. 4, 2007

(86) PCT No.: PCT/KR2007/006246
§ 371 (c)(1),
(2), (4) Date: Sep. 8, 2008

(87) PCT Pub. No.: WO2009/072683
PCT Pub. Date: Jun. 11, 2009

(65) Prior Publication Data
US 2010/0233578 A1    Sep. 16, 2010

(51) Int. Cl.
*H01M 8/10*    (2006.01)
(52) U.S. Cl. ............... 429/492; 429/483; 429/523
(58) Field of Classification Search .......... 429/492, 429/483, 523
See application file for complete search history.

(56) References Cited

U.S. PATENT DOCUMENTS

| 6,391,818 B1 | 5/2002 | Bonsel et al. | |
| 2007/0231674 A1* | 10/2007 | Shelnutt et al. | 429/44 |
| 2008/0292931 A1 | 11/2008 | Schwartz et al. | |

FOREIGN PATENT DOCUMENTS

| CN | 1790785 A | 6/2006 |
| CN | 1979930 A | 6/2007 |
| JP | 11006091 A | 1/1999 |
| KR | 10-2004-0025987 | 3/2004 |
| TW | 200742157 | 12/1995 |

OTHER PUBLICATIONS

Watanabe et al., "Preparation of Highly Dispersed Pt+Ru Alloy Clusters and the Activity for the Electrooxidation of Methanol", J. Electroanal. Chem., 1987, pp. 395-406, vol. 229.
Bonnemann et al., "Erzeugung von kolloiden Ubergangsmetallen in organischer Phase und ihre Anwendung in der Katalyse", Angew. Chem., 1991, pp. 1344-1346, vol. 103.
Li et al., "Carbon Nanotubes as Support for Cathode Catalyst of a Direct Methanol Fuel Cell", Carbon, 2002, pp. 791-794, vol. 40.
Xue et al., "Simple and Controllable Synthesis of Highly Dispersed Pt-Ru/C Catalysts by a Two-Step Spray Pyrolysis Process", Chem. Commun., 2005, pp. 1601-1603. Kim et al., "A Novel Preparation Route for Platinum-Polystyrene Heterogenous Nanocomposite Particles Using Alcohol-Reduction Method", J. of Colloid and Interface Science, 2006, pp. 365-369, vol. 297.
Choi et al., "A PtAu Nanoparticle Electrocatalyst for Methanol Electro-oxidation in Direct Methanol Fuel Cells", J. of the Electrochemical Society, 2006, pp. A1812-A1817, vol. 153(10).

* cited by examiner

*Primary Examiner* — Jill Warden
*Assistant Examiner* — Monique Cole
(74) *Attorney, Agent, or Firm* — The Webb Law Firm

(57) ABSTRACT

The present invention relates to a process for the preparation of electrochemical catalysts of the polymer electrolytes-based fuel cells. With the process of the present invention, high catalyst activity while uniformly supporting a large amount of metal particles on a surface of a support can be achieved. Also, the present invention provides a process for the preparation of electrochemical catalysts of the polymer electrolytes-based fuel cells capable of using a small amount of toxic solvent without an additional high-temperature hydrogen annealing.

11 Claims, 7 Drawing Sheets

PROCESS FOR THE ELECTROCHEMICAL CATALYSTS OF FUEL CELLS BASED ON POLYMER ELECTROLYTES

BACKGROUND OF THE INVENTION

1. Field of the Invention

The present invention relates to a process for the preparation of electrochemical catalysts of fuel cells based on polymer electrolytes with excellent electrochemical catalysts activity by uniformly supporting a large amount of nano-sized metal particles on the carbon support surface without agglomeration.

2. Description of Related Art

A fuel cell is an apparatus that converts chemical energy of fuel into electric energy by the electrochemical reaction of fuel, such as hydrogen or methanol, and oxygen. The fuel cell has been spotlighted as a next generation clean energy source because of the high generation efficiency without suffering from a carnot cycle and the lower emission of pollutants such as $NO_x$, $SO_x$ than the existing thermal power generations. It also does not generate noise during operation. The fuel cell is sorted into a polymer electrolyte fuel cell (PEMFC), a phosphoric acid fuel cell (PAFC), a molten carbonate fuel cell (MCFC), a solid oxide fuel cell (SOFC), etc., according to an electrolyte used. Among others, the polymer electrolyte fuel cell has features of lower operating temperature, better generation efficiency, and more compact than the other fuel cells, therefore, it is widely used as a power supply for an electric vehicle, a small power plant for a house, a mobile emergency power supply, and a power supply for a military, etc.

The polymer electrolyte fuel cell is typically formed in a five-layer structure of collector/fuel electrode/polymer electrolyte membrane/air electrode/collector. The fuel cell is supplied with fuel such as hydrogen or methanol and the air electrode is supplied with air or oxygen. The fuel is oxidized in the fuel electrode to generate protons and electrons. At this time, the protons move to the air electrode through the electrolyte membrane and the electrons move to the air electrode through wires and loads configuring an external circuit. The reduction reaction of protons and electrons with oxygen is performed in the air electrode generating water, wherein water is then discharged from the fuel cell.

Both electrodes of the polymer electrolyte fuel cell are manufactured by forming a catalyst layer on the carbon species or carbon clothes through an application of an ink made of a catalyst for the activation of the oxidation-reduction reaction, a polymer electrolyte, and a solvent. For a catalyst, a platinum-based catalyst such as platinum or an alloy of platinum/ruthenium with very excellent catalyst activity in carbon particulate support has been in practical use.

The catalyst for the polymer electrolyte fuel cell should have characteristics, such as a large specific surface area of metal particle, strong adhesion between the metal particle and the catalyst support, improved CO tolerance, chemical uniformity between metal atoms upon alloying, etc. In particular, a large amount of metal particles should be uniformly supported on a surface of the carbon particulate without agglomeration so that the electrochemical catalyst activity becomes high. Also, for the early commercialization of the fuel cell, a manufacturing process of the catalyst should be inexpensive and environment-friendly.

As a conventional process of manufacturing the catalyst, an absorbent reduction process, which mixes an aqueous solution of platinum compound or an aqueous solution of platinum compound and ruthenium compound with a carbon powder as a catalyst support and disperses the mixture, precipitates particles by adding a reducing agent, such as sodium borohydride ($NaBH_4$), alcohol, aldehyde, etc., thereto, or reduces it by performing an annealing under a hydrogen atmosphere, has been generally used. This process is ease and convenient, but when a supported amount of metal particles is increased, it is difficult to support them uniformly without agglomeration and also hard to control the particle size.

As an alternative process, the colloid method was proposed by Watanabe (J. Electroanal. Chem., 229, 1987, 395), etc. This process can uniformly precipitate particles on a colloid using $NaHSO_3$, $H_2O_2$ as a reducing agent. However, this process has a difficulty in controlling a reaction condition such as pH and since a particle phase is precipitated in an oxide form, it requires a high-temperature hydrogen annealing, thereby increasing its manufacturing cost. As a result, this process is not proper for the mass production.

Another process, Bonnemann process (Angew. Chem., 103, 1991, 1344)—prepares the catalysts by synthesizing metal particles stabilized through surfactant followed by the attachment of them to carbon support. This process is not suitable for the mass production due to a use of toxic solvent, tetrahydrofuran (THF), a need of the high-temperature hydrogen annealing treatment like the Watanabe process, and a relatively weak adhesion between the metal particle and the carbon support.

In addition to the aforementioned processes, a pyrolysis process (Xing et al., Chem. Comm., 12, 2005, 1601.)—supports metal particles by pyrolyzing an aerosol made of support and metal compound by allowing it to pass through a reactor in a high-temperature reduction atmosphere state using a carrier gas, or a vapor phase synthesis process such as a combustion chemical vapor deposition process (Yu Ji Bum, Korea patent application No, 10-2004-0025987) prepares a catalyst by using support as a substrate and performing a chemical vapor reaction of metal compound on the support. Since these processes have problems in that the yield of the catalyst is low and the supported amount of metal particles is restricted, it is known that they are not proper for mass production.

Meanwhile, many studies on the improvement of the support, which is another component configuring the catalyst, have been progressed. Since the support firmly supports the metal particles and also severs as a path for rapidly moving electrons generated upon performing the oxidation-reduction reaction to the collector, it should be strongly adhered to the metal particles and have excellent electrical conductivity. As usual support, carbon black with a large specific surface area such as Vulcan-XC or Ketjen Black has been used. Recently, for the purpose of increasing catalyst availability, carbon fiber or carbon nanotube having excellent electrical conductivity due to a large aspect ratio and a crystal structure of a graphite phase has been actively studied. However, when using the carbon fiber or the carbon nanotube as the support, the most serious problems are that it is difficult to disperse the support and to support a large amount of metal particles due to a relatively small specific surface area and also it is easy to generate an agglomeration between the metal particles

SUMMARY OF THE INVENTION

An object of the present invention is to provide a process for the electrochemical catalysts of the polymer electrolytes-based fuel cells with high catalyst activity by uniformly supporting a large amount of metal particles on the catalyst support regardless of its type.

Another object of the present invention is to provide a process for the electrochemical catalysts of polymer electrolytes-based fuel cells, which is appropriate for mass production since it uses a small amount of toxic solvent without a high-temperature hydrogen annealing.

The present invention increases a degree of dispersion of support catalyst support to maximize a surface area increasing the amount of supported catalyst and supports nano-sized metal particles uniformly in support through a formation of a micelle by surfactant. An organization of the present invention is as follows.

The present invention includes the steps of:

A) maximizing a specific surface area of support by rapid dispersion of the support into a primary particle using a high output ultrasonic wave after mixing the support and a solvent B) preparing a precursor solution formed with a micelle containing precursor ions by separately adding surfactant to an aqueous solution of metal precursor;

C) injecting the precursor solution manufactured in the step B) into the support dispersion to which the high output ultrasonic wave of the step A) is applied and allowing the micelle to be adsorbed on the surface of the support;

D) transforming metal ions within the micelle adsorbed on the surface of the support into metal crystal nuclei by injecting a reducing agent and, at the same time, allowing the metal crystal nuclei not to be agglomerated each other by means of the micelle surrounding the respective metal crystal nuclei;

E) increasing crystallinity of the particle by growing the metal crystal nuclei within the micelle supported on the surface of the support to a size of 2 to 5 nm by raising a temperature;

F) rapidly cooling the particles to stop the growth thereof;

G) cleaning the micelle surrounding the metal particles and removing unreacted precursors; and H) drying and classifying.

The present invention can support a large amount of metal particles in environmental friendly and economical way irrespective of a kind of support or a kind of metal.

BRIEF DESCRIPTION OF THE DRAWINGS

The above and other objects, features and advantages of the present invention will become apparent from the following description of preferred embodiments given in conjunction with the accompanying drawings, in which:

FIGS. 5(a), (b), and (c) are TEM photographs for an alloy catalyst of platinum/ruthenium supported in the CNT support at a weight ratio of platinum and ruthenium of 6.9:3.1, 5.1:4.9, and 3.2:6.8 in embodiments 4, 5, 6, respectively;

FIGS. 6(a), (b), and (c) are TEM photographs for the platinum catalysts supported in the CNT support according to comparison examples 1, 2, 3;

Figure 1:
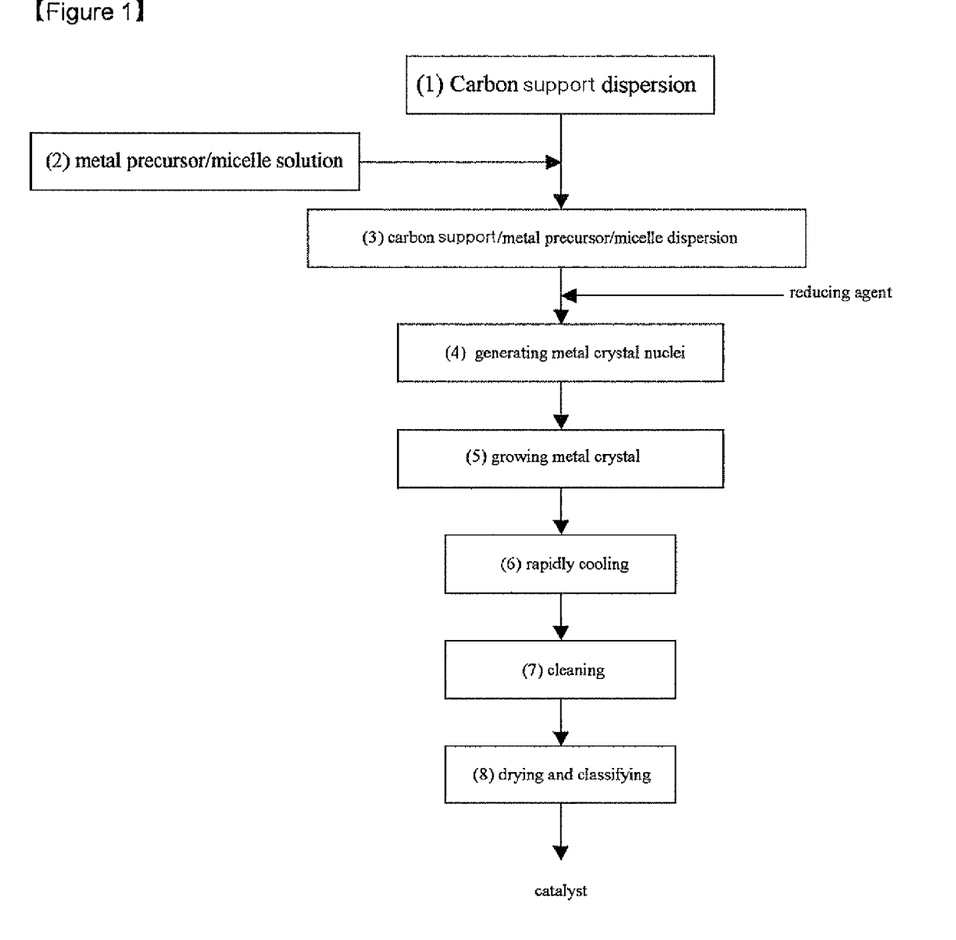
FIG. 1 is a process diagram of manufacturing catalysts for a polymer electrolyte fuel cell according to one embodiment of the present invention.

Hereinafter, the embodiments of the present invention will be described in detail with reference to a manufacturing process diagram of FIG. 1. FIG. 1 is a process diagram according to one embodiment.

In (1) of FIG. 1, carbon support and solvent are injected in a reactor installed with a high output ultrasonic wave oscillator and an agitator and dispersed to a primary particle level so that a specific surface area of the support is maximized. The carbon support used in the present invention may include carbon black, activation carbon, carbon nanotube, carbon nanofiber, carbon nanohorn, carbon ball, and a mixture thereof. It is preferable to perform a pre-processing so as to remove various impurities generated in a synthesis process of the support and to attach a functional group to a surface thereof for the dispersion of the support.

Preferably, the ultrasonic wave apparatus used in the present invention is a high output type of 20 Khz or more and 600 W or more and is installed in the reactor.

As the solvent used for dispersing the carbon support, water, alcohol such as methanol, ethanol, and propanol, a nonpolar solvent such as tetrahydrofuran and acetone, or a polar solvent such as benzene and toluene may be used. Among others, water is the most appropriate.

Preferably, 0.05 to 0.1 parts by weight of the carbon support for 100 parts by weight of the solvent is used. If it is less than 0.05 parts by weight, yield is lowered and thus productivity is reduced, and if it is more than 0.1 parts by weight, a degree of dispersion of the support is lowered. Preferably, time required to disperse the carbon support to the primary particle level is between several seconds and 120 minutes, but it is not limited thereto.

In (2) of FIG. 1, surfactant is added to an aqueous solution where metal precursor is dissolved by using a separate reactor to form a micelle containing metal precursor ions. The micelle can take various forms, including a spherical form and a cylindrical form which are a geometry arrangement of surfactant having a hydrophilic functional group and a hydrophobic functional group.

The surfactant used in the present invention forms the micelle containing the metal precursor ions. This micelle is very important since it performs a role of forming metal ions as metal crystal nuclei in a reduction process ((4) of FIG. 1) to be described later and at the same time, of allowing the metal crystal nuclei not to be agglomerated to each other and it should be easily cleaned in a cleaning process ((7) of FIG. 1) to be described later. According to the present invention, any kinds of surfactants may be used excepting for a case of hindering the metal particles from being supported uniformly or requiring a high temperature annealing for cleaning them, however, sulfonate-based materials are appropriate. Also, it is appropriate that the amount thereof is 0.1 to 1 parts by weight for 100 parts by weight of the carbon support. If it is less than 0.1 parts by weight, the micelle is not formed and thust the growth of the particle occurs, thereby reducing the uniformity of the particle size, and if it is more than 1 part by weight, an agglomeration phenomenon between the particles occurs.

The metal precursor used in the present invention may include chloride, salt oxide, acetyl acetone compound, ammonium salt, and bromide of metals, such as platinum, ruthenium, palladium, gold, iridium, rhenium, iron, nickel, cobalt, tungsten, molybdenum, etc., and alloys thereof. It is appropriate that the amount of the metal precursor is 25 to 400 parts by weight for 100 parts by weight of the carbon support, more preferably, 66.6 to 150 parts by weight for 100 parts by weight of the carbon support. If the amount of the metal precursor is less than 25 parts by weight, the supported amount is small and thus the catalyst activity is reduced and if it is more than 400 parts by weight, the agglomeration phenomenon of the catalyst occurs.

In (3) of FIG. 1, the micelle solution is injected in the support dispersion solution while the high output ultrasonic wave oscillator and the agitator are concurrently operated so that the micelle is adsorbed on the surface of the support. It is appropriate that adsorption time is 60 minutes or more. If the adsorption time is less than 60 minutes, the complete adsorption is not performed.

In (4) of FIG. 1, the reducing agent is injected in the solution of the above (3) while the high output ultrasonic wave oscillator and the agitator are concurrently operated, thereby forming metal ions within the micelle adsorbed on the surface of the support as metal crystal nuclei and at the same time, allowing the metal crystal nuclei not to be agglomerated to each other by means of the micelle surrounding the respective metal crystal nuclei. It is more advantageous in the aspect of energy that the crystal nuclei are generated on the surface of the support rather than are generated in the solution due to the density of the carbon support existing in the solution. As the reducing agent used in the present invention, any reducing agents, including hydrazine aqueous solution, formaldehyde aqueous solution, sodium borohydride aqueous solution, alcohol, hydrogen gas, etc., may be used. In other words, unless the reducing agent causes the agglomeration of the carbon support or the metal particles, it is not especially limited. However, the alcohol with weak reducibility is the most appropriate. The amount of the reducing agent is 25 to 50 parts by weight for 100 parts by weight of the carbon support in the solution of the above (3), preferably 30 to 40 parts by weight in order to uniformly support the catalyst particle. Upon generating the nuclei while concurrently operating the high output ultrasonic wave oscillator and the agitator, the temperature range is preferably between 30 and 70° C. that is a temperature for generating the crystal nuclei and the nucleation time is preferably between 1 and 60 minutes.

In (5) of FIG. 1, the crystallinity of the particle is increased by growing the metal crystal nuclei within the micelle supported on the surface of the support to a size of 2 to 5 nm by raising a temperature within the reactor. The metal particle size can be controlled according to a kind of the micelle. In the case of the catalyst of the fuel cell, it is known that the particle of 2 to 5 nm is optimal. Upon performing the reduction, the temperature range is between 80 to 100° C. that is a temperature oxidizing and vaporizing alcohol acting as the reducing agent and the reduction is performed for about 60 minutes to 2 hours. If the reduction is shorter than 60 minutes, the platinum precursor is not completely reduced and if it is longer than 2 hours, the agglomeration phenomenon between the supported platinum particles occurs. Therefore, it is the most preferable to perform the reaction for one hour at 90° C.

In (6) of FIG. 1, the particles are rapidly cooled to stop the growth thereof. When slowly lowering the temperature within the reactor, since an unexpected agglomeration between the particles occurs and some particles are coarse so that the overall specific surface area of the metal particle can be reduced, it is important to rapidly cool the solution of the above (5). If the metal particle is not separated from the support by means of thermal stress due to a temperature difference, any processes, including the reactor where a chiller or a tub filled with ice or dry ice is operated, etc., may be used.

In (7) of FIG. 1, the micelle surrounding the metal particles is cleaned and unreacted precursors, etc., are removed. In order to clean the metal particles, they are repeated and filtered several times using alcohol or water or a mixed liquid thereof to have ion conductivity of 1 µS. In addition to the filtering and cleaning processes, the unreacted metal precursors included in the solution are removed by a desalting method, such as dialysis, electrodialysis, ion exchange, ultrafiltration, etc.

In (8) of FIG. 1, the cleaned catalyst is dried and is classified using a sieve, etc. The drying method may use a vacuum oven between 80 to 120° C., a spray dry, a freeze dry, etc.

The process of manufacturing the catalyst of the present invention maximizes the specific surface area of the support by rapidly dispersing the support into the primary particle using high output ultrasonic wave, generates the crystal nuclei of metal particles by using the micelle using the surfactant as a mold frame, allows the respective metal crystal nuclei not to be agglomerated to each other, controls the particle size supported on the surface of the support to the size of several nm by introducing the low temperature crystal growth process and the rapid cooling process, and removes the micelle (mold frame) surrounding the particles through the cleaning. With the present invention, the process for the electrochemical catalysts of fuel cells based on polymer electrolytes, which uniformly supports a large amount of metal particles, has high catalyst activity, uses a small amount of toxic solvent, and is appropriate for mass production since it uses a small amount of toxic solvent and does not require a high-temperature hydrogen annealing, is provided.

The electrochemical catalyst manufactured by the present invention is included in the scope of the present invention, a membrane-electrode assembly where the electrochemical catalyst is attached to the electrolyte membrane for the polymer electrolyte fuel cell is included in the scope of the present invention, and the fuel cell including the membrane-electrode assembly is also included in the scope of the present invention.

Preferably, the fuel cell includes a laminate configured in order of collector/cathode/polymer electrolyte membrane/anode/collector/cathode/polymer electrolyte membrane/anode/collector; a terminal connected to supply fuel and oxidizing agent to the cathode and the anode; and a battery case surrounding and sealing the laminate; however, the fuel cell is not limited thereto.

Hereinafter, the present invention will be described in more detail based on the following embodiments and comparison examples. However, the following embodiments are only one example of the present invention and the scope of the present invention is not limited thereto.

[Embodiment 1]

Carbon nanotube (CNT: Multiwall nanotube (MWNT), nanocarbon product) is injected in 6M HCl solution and is agitated for 10 hours or more at a temperature of 150° C. Thereafter, it is repetitively subjected to filtering and cleaning processes several times. Then, when measuring a residual quantity of transition metal catalyst attached to a surface of the CNT using a mass spectroscopy (MS), the amount thereof should be 1% or less based on part by weight of the CNT. Next, amorphous carbon impurity components remaining on the surface of the CNT are removed by performing an annealing for two hours under a temperature of 300° C. in the air. Thereafter, the carbon nanotube is injected in aqua regia (hydrochloric acid and nitric acid of 3:1) aqueous solution and is agitated for one hour or more at a temperature of 50° C. so that the CNT support with a functional group of OH⁻ or COOK attached to the surface of the CNT is prepared.

The CNT support of 2 g is mixed with ultrapure water of 1 l L and is dispersed for two hours within a reactor having a high output ultrasonic wave oscillator and an agitator concurrently operated. As a result of measuring a particle size distribution of the dispersed CNT support using a particle size analyzer (product available from Microtrac Co.), an average particle size (d50) is 100 nm. This size is approximately similar to an average size of the CNT particles previously analyzed by a scanning electron microscope (SEM) followed by the dispersion. As a result, it can be appreciated that it is dispersed to a primary particle level. Hexachloroplatinate salt ($H_2PtCl_6H_2O$) of 3.54 g added in a separate reactor to make a weight ratio of carbon and platinum 6:4. and surfactant (SB12, product available from Sigma Co.) of 10 mg are injected in the ultrapure water of 1 L and are agitated for one hour in a separate reactor to manufacture a micelle solution. This micelle solution is injected in the CNT support dispersion and is further dispersed for about 20 minutes while the high output ultrasonic wave oscillator and the agitator are concurrently operated. Thereafter, when methanol mixed liquid (ultrapure water:methanol=3:1) of 4 L as a reducing agent is injected and a temperature is slowly raised to 50° C., it is reacted for one hour in a state where the high output ultrasonic wave oscillator and the agitator are concurrently operated. Thereafter, it is agitated for one hour after the high output ultrasonic wave oscillator is turned off and the temperature of the reactor is raised to 100° C. and it is cooled by rapidly putting into ice water after the reaction is completed. The solution is repetitively filtered with ethanol and ultrapure water until the surfactant is removed and ion conductivity of residual solution is 1 µS or less, using a membrane filter (product available from Pall Corp.) of 1 µm or less. Then, the cleaned sample is dried for 12 hours in a vacuum oven operated at 85° C. and is classified using a sieve so that the platinum catalyst supported in the CNT is obtained.

Figure 2:
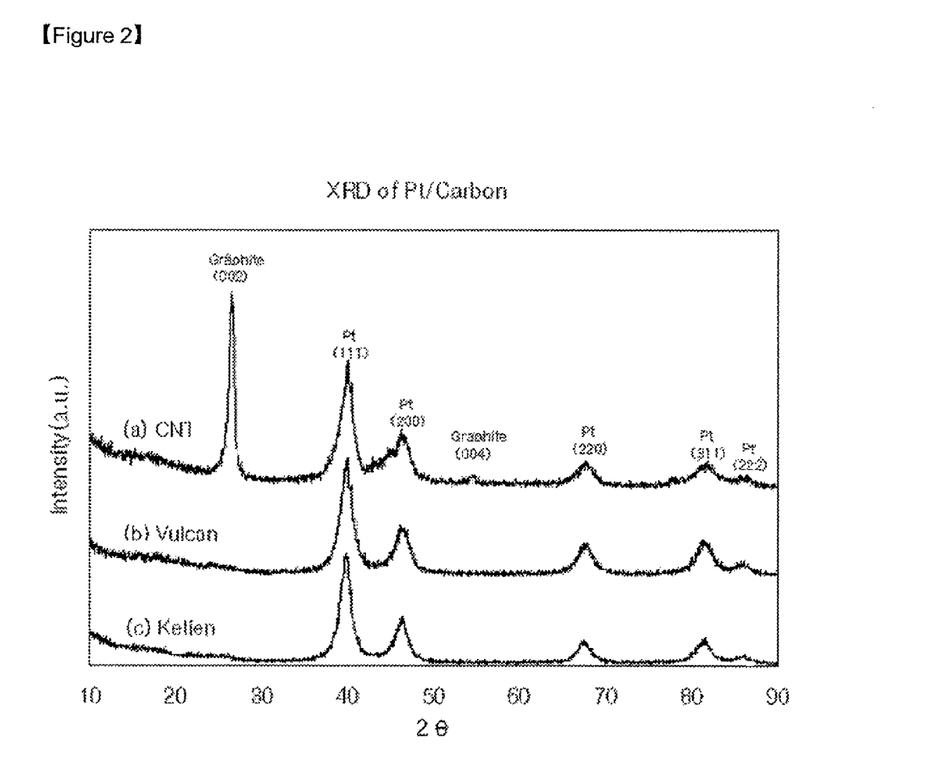
FIG. 2 shows a graph of X-ray diffraction spectroscopy (XRD) for a platinum catalyst supported in carbon nanotube (CNT) support, a platinum catalyst supported in Vulcan XC 72 support that is carbon black, and a platinum catalyst supported in Ketjen black support that is carbon black, manufactured according to embodiments 1, 2, 3, respectively.
Figure 4:
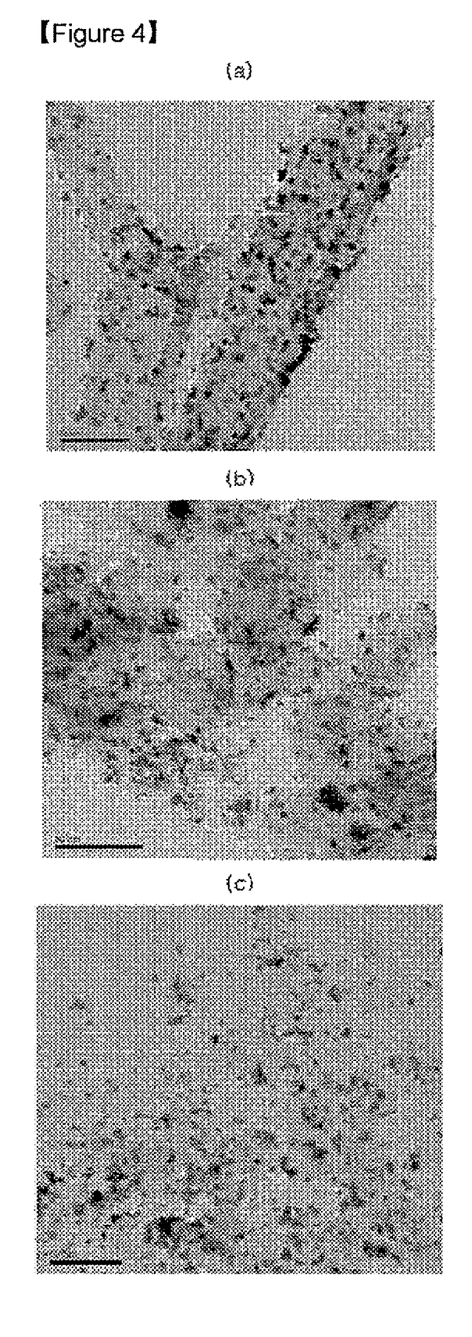
FIG. 4(a) is a transmission electron microscope (TEM) photograph for the platinum catalyst supported in the CNT support manufactured according to the embodiment 1.
FIG. 4(b) is a transmission electron microscope (TEM) photograph for platinum catalyst supported in the Vulcan XC 72 support manufactured according to the embodiment 2.
FIG. 4(c) is a transmission electron microscope (TEM) photograph for platinum catalyst supported in the Ketjen black support manufactured according to the embodiment 3.

According to a result of analyzing a mass of the platinum catalyst supported in the CNT using the MS, it can be appreciated that a weight ratio of carbon and platinum is 5.9:4.1. FIG. 2(a) shows a result of X-ray diffraction spectroscopy (XRD) for the platinum catalyst supported in the CNT. A well grown platinum phase with a crystal size of 2.8 nm together with a graphite structure of the CNT based on a (111) surface can be seen in FIG. 2(a). FIG. 4(a) is a transmission electron microscope (TEM) photograph showing platinum particles of 5 nm or less uniformly supported on the surface of the CNT.

[Embodiment 2]

Carbon black (Vulcan XC72, product available from Cabot Co.) as another support is injected in an aqueous solution and is agitated and circulated for 10 hours or more at a temperature of 100° C. Thereafter, it is filtered and sufficiently cleaned with ultrapure water so that the carbon black Vulcan XC 72 support is prepared.

The Vulcan XC 72 support of 2 g is injected in ultrapure water of 1 l L and is dispersed for three hours while concurrently operating the high output ultrasonic wave oscillator and the agitator. Hexachloroplatinate salt ($H_2PtCl_6H_2O$) of 3.54 g added in a separate reactor to make a weight ratio of carbon and platinum 6:4 and surfactant (SB12, product available from Sigma Co.) of 10 mg are injected in the ultrapure water of 1 L and are agitated for one hour to manufacture a micelle solution. This micelle solution is injected in the Vulcan XC 72 support dispersion and is further dispersed for about 20 minutes while the high output ultrasonic wave oscillator and the agitator are concurrently operated. Thereafter, when methanol solution (ultrapure water:methanol=3:1) of 4 L used as a reducing agent is injected and a temperature is slowly raised to 60° C., it is reacted for one hour in a state where the high output ultrasonic wave oscillator and the agitator are concurrently operated. Thereafter, it is agitated for one hour after the operation of the ultrasonic wave oscillator is turned off and the temperature of the reactor is raised to 110° C. and it is cooled by putting into ice water after the reaction is completed. The solution is repetitively filtered with ethanol and ultrapure water until the surfactant is removed and ion conductivity of residual solution is 1 µS or less, using a membrane filter (product available from Pall Corp.) of 1 µm or less. Then, the cleaned catalyst is dried for 12 hours in a vacuum oven operated at 85° C. and is classified using a sieve so that the platinum catalyst supported in the Vulcan XC 72 is obtained.

According to a result of analyzing a mass of the platinum catalyst supported in the Vulcan XC 72 using the MS, it can be appreciated that a weight ratio of carbon and platinum is 6.1:3.9. FIG. 2(b) shows a result of X-ray diffraction spectroscopy (XRD) for the platinum catalyst supported in the Vulcan XC 72. A well grown platinum phase with a crystal size of 2.7 nm based on a (111) surface can be seen in FIG. 2(b). FIG. 4(b) is a transmission electron microscope (TEM) photograph showing platinum particles of 5 nm or less uniformly supported on the surface of the Vulcan XC 72.

[Embodiment 3]

Carbon black (EC300J, product available from MITSIBISH CHEMICAL CO.) as another support is injected in an aqueous solution and is agitated and circulated for 10 hours or more at a temperature of 100° C. Thereafter, it is filtered and sufficiently cleaned with ultrapure water so that the carbon black Ketjen black support is prepared.

The Ketjen black of 2 g is injected in ultrapure water of 1 l L and is dispersed for three hours while concurrently operating the high output ultrasonic wave oscillator and the agitator. Hexachloroplatinate salt ($H_2PtCl_6H_2O$) of 3.54 g added in a separate reactor to make a weight ratio of carbon and platinum 6:4 and surfactant (SB12, product available from Sigma Co.) of 10 mg are injected in the ultrapure water of 1 L and are agitated for one hour to manufacture a micelle solution. This micelle solution is injected in the Ketjen black support dispersion and is further dispersed for about 20 minutes while the high output ultrasonic wave oscillator and the agitator are concurrently operated. Thereafter, when methanol solution (ultrapure water:methanol=3:1) of 4 L used as a reducing agent is injected and a temperature is slowly raised to 60° C., it is reacted for one hour in a state where the high output ultrasonic wave oscillator and the agitator are concurrently operated. Thereafter, it is agitated for one hour after the temperature of the reactor is raised to 110° C. and it is cooled by putting into ice water after the reaction is completed. The solution is repetitively filtered with ethanol and ultrapure water until the surfactant is removed and ion conductivity of residual solution is 1 µS or less, using a membrane filter (product available from Pall Corp.) of 1 µm or less. Then, the cleaned catalyst is dried for 12 hours in a vacuum oven operated at 85° C. and is classified using a sieve so that the platinum catalyst supported in the Ketjen black is obtained.

According to a result of analyzing a mass of the platinum catalyst supported in the Ketjen black using the MS, it can be appreciated that a weight ratio of carbon and platinum is 6.2:3.8. FIG. 2(c) shows a result of X-ray diffraction spectroscopy (XRD) for the platinum catalyst supported in the EC 300J. A well grown platinum phase with a crystal size of 2.7 nm based on a (111) surface can be seen in FIG. 2(c). FIG. 4(c) is a transmission electron microscope (TEM) photograph showing platinum particles of 4 nm to 5 nm or less uniformly supported on the surface of the Ketjen black.

[Embodiment 4]

The CNT support of 2 g prepared according to the same as the is embodiment 1 is injected in ultrapure water of 1 L and is dispersed for two hours while concurrently operating the high output ultrasonic wave oscillator and the agitator.

Hexachloroplatinate salt ($H_2PtCl_6H_2O$) of 2.48 g and chloruthenium salt ($RuCl_3H_2O$) of 1.03 g added in a separate reactor to make a weight ratio of platinum and ruthenium 7:3 and to make a weight ratio of metal powders with combined carbon, platinum, and ruthenium 6:4, and surfactant (SB12, product available from Sigma Co.) of 10 mg are injected in the ultrapure water of 1 L and are agitated for one hour to manufacture a micelle solution. This micelle solution is injected in the CNT support dispersion and is further dispersed for about 20 minutes while the high output ultrasonic wave oscillator and the agitator are concurrently operated. Thereafter, when methanol solution (ultrapure water:methanol=3:1) of 4 L used as a reducing agent is injected and a temperature is slowly raised to 60° C., it is reacted for one hour in a state where the high output ultrasonic wave oscillator and the agitator are concurrently operated. Thereafter, it is agitated for one hour after the temperature of the reactor is raised to 110° C. and it is cooled by putting into ice water after the reaction is completed. The solution is repetitively filtered with ethanol and ultrapure water until the surfactant is removed and ion conductivity of residual solution is 1 μS or less, using a membrane filter (product available from Pall Corp.) of 1 μm or less. Then, the cleaned catalyst is is dried for 12 hours in a vacuum oven operated at 85° C. and is classified using a sieve so that an alloy catalyst of platinum/ruthenium supported in the CNT support is obtained.

Figure 3:
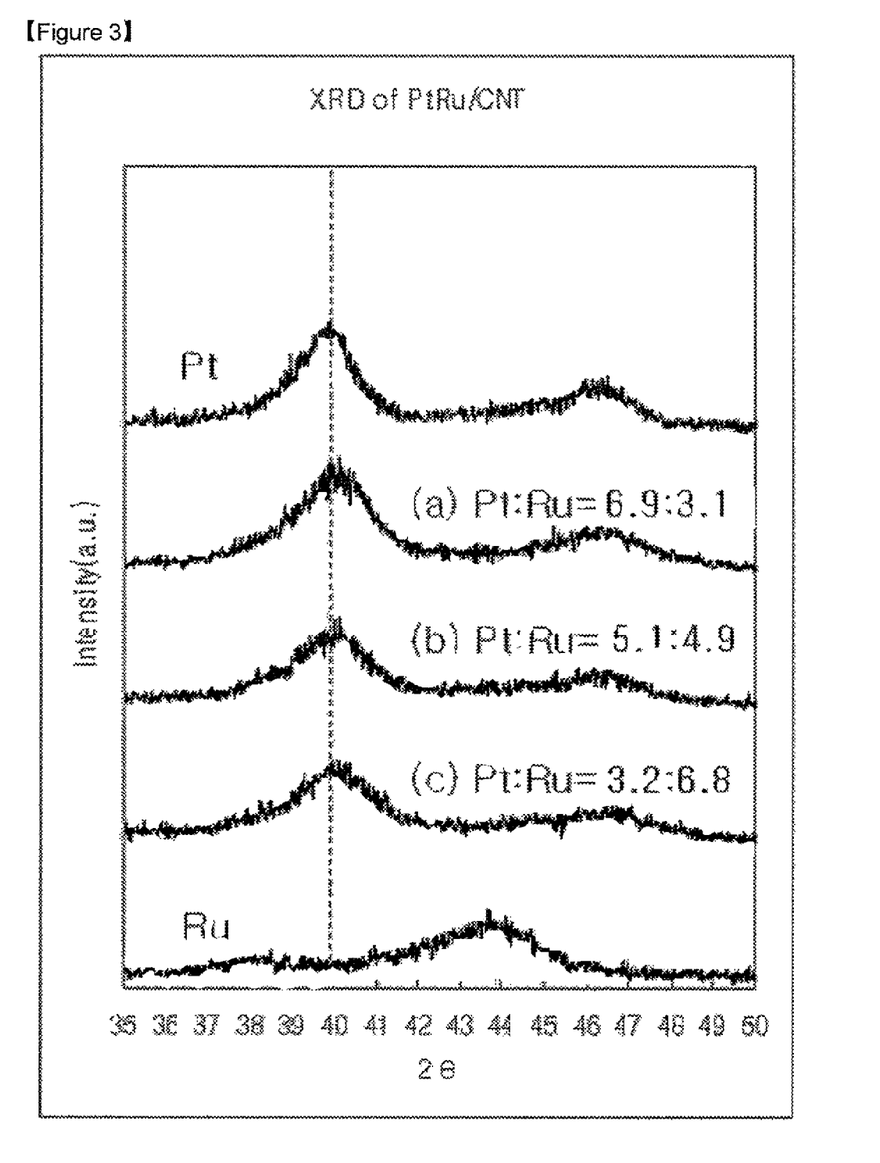
FIG. 3 shows a graph of the XRD for an alloy catalyst of platinum/ruthenium supported in the CNT support at a weight ratio of platinum and ruthenium of 6.9:3.1, 5.1:4.9, and 3.2:6.8 in embodiments 4, 5, 6, respectively.
Figure 5:
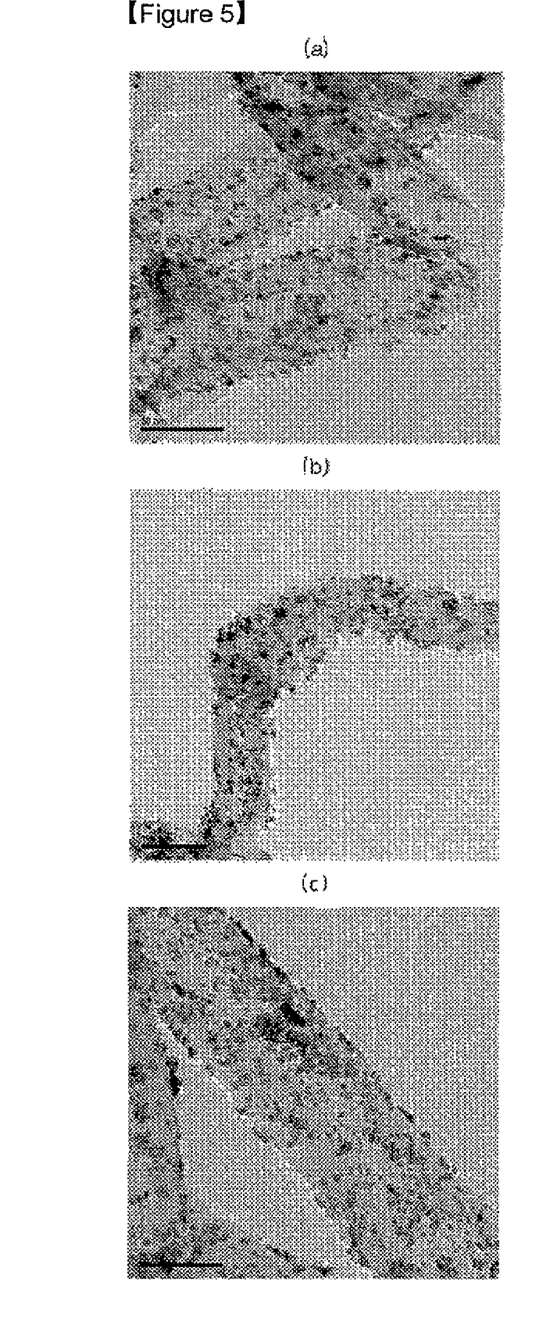

According to a result of analyzing a mass of the alloy catalyst of platinum/ruthenium supported in the CNT using the MS, it can be appreciated that a weight ratio of platinum and ruthenium is 6.9:3.1 and a weight ratio of metal powders with combined platinum and ruthenium is 6.1:3.9. FIG. 3(a) shows a result of X-ray diffraction spectroscopy (XRD) for the alloy catalyst of platinum/ruthenium supported in the CNT. It can be appreciated from FIG. 3(a) that there is no a remaining ruthenium phase and a position of platinum (111) peak is slightly moved to a large direction of 2θ so that the platinum and ruthenium are well alloyed. FIG. 5(a) is a transmission electron microscope (TEM) photograph showing platinum/ruthenium particles of 5 nm or less uniformly supported on the surface of the CNT.

[Embodiment 5]

An embodiment 5 manufactures an alloy catalyst of platinum and ruthenium according to the embodiment 4, excepting that hexachloroplatinate salt ($H_2PtCl_6H_2O$) and chlororuthenium salt ($RuCl_3H_2O$) are added to make a weight ratio of platinum and ruthenium 5:5 and to make a weight ratio of metal powders with combined carbon, platinum and ruthenium 6:4.

According to a result of analyzing a mass of the alloy catalyst of platinum/ruthenium supported in the CNT using the MS, it can be appreciated that a weight ratio of platinum and ruthenium is 5.1:4.9 and a weight ratio of metal powders with combined carbon, platinum, and ruthenium is 6.2:3.8. FIG. 3(b) shows a result of X-ray diffraction spectroscopy (XRD) for the alloy catalyst of platinum/ruthenium supported in the CNT. It can be appreciated from FIG. 3(b) that there is no a remaining ruthenium phase and a position of platinum (111) peak is slightly more moved to a large direction of 2θ than the embodiment 4 so that the platinum and ruthenium are well alloyed. FIG. 5(b) is a transmission electron microscope (TEM) photograph showing platinum/ruthenium particles of 5 nm or less uniformly supported on the surface of the CNT.

[Embodiment 6]

An embodiment 6 manufactures an alloy catalyst of platinum and ruthenium according to the embodiment 4, excepting that hexachloroplatinate salt ($H_2PtCl_6H_2O$) and chlororuthenium salt ($RuCl_3H_2O$) are added to make a weight ratio of platinum and ruthenium 3:7 and to make a weight ratio of metal powders with combined carbon, platinum and ruthenium 6:4.

According to a result of analyzing a mass of the alloy catalyst of platinum/ruthenium supported in the CNT using the MS, it can be appreciated that a weight ratio of platinum and ruthenium is 3.2:6.8 and a weight ratio of metal powders with combined carbon, platinum, and ruthenium is 6.2:3.8. FIG. 3(c) shows a result of X-ray diffraction spectroscopy (XRD) for the alloy catalyst of platinum/ruthenium supported in the CNT. It can be appreciated from FIG. 3(c) that there is no a remaining ruthenium phase and a position of platinum (111) peak is slightly more moved to a large direction of 2θ than the embodiment 5 so that the platinum and ruthenium are well alloyed. FIG. 5(c) is a transmission electron microscope (TEM) photograph showing platinum/ruthenium particles of 5 nm or less uniformly supported on the surface of the CNT.

COMPARISON EXAMPLE 1

The platinum catalyst supported in the CNT is manufactured according to the known document (Xin et al., Carbon, 40, 2002, 791). The CNT support of 2 g prepared according to the same process as the embodiment 1 is injected in ethylene glycol (product available from Aldrich Co.) and is dispersed in the agitator for one hour. Hexachloroplatinate salt ($H_2PtCl_6H_2O$) added in a separate reactor to make a weight ration of carbon and platinum 6:4 are injected in the ultrapure water of 1 L without injecting surfactant and is agitated for one hour to manufacture a solution. This solution is injected in a solution in which the CNT support is dispersed and is agitated and circulated for three hours or more at 180° C. to support the platinum particles. It is cooled by rapidly putting into ice water after the reaction is completed. The solution is repetitively filtered with ultrapure water until ion conductivity of residual solution is 1 μS or less using a membrane filter (product available from Pall Corp.) of 1 μm or less. Then, the cleaned sample is dried for 12 hours in a vacuum oven operated at 85° C. and is classified using a sieve so that the platinum catalyst supported in the CNT is obtained.

Figure 6:
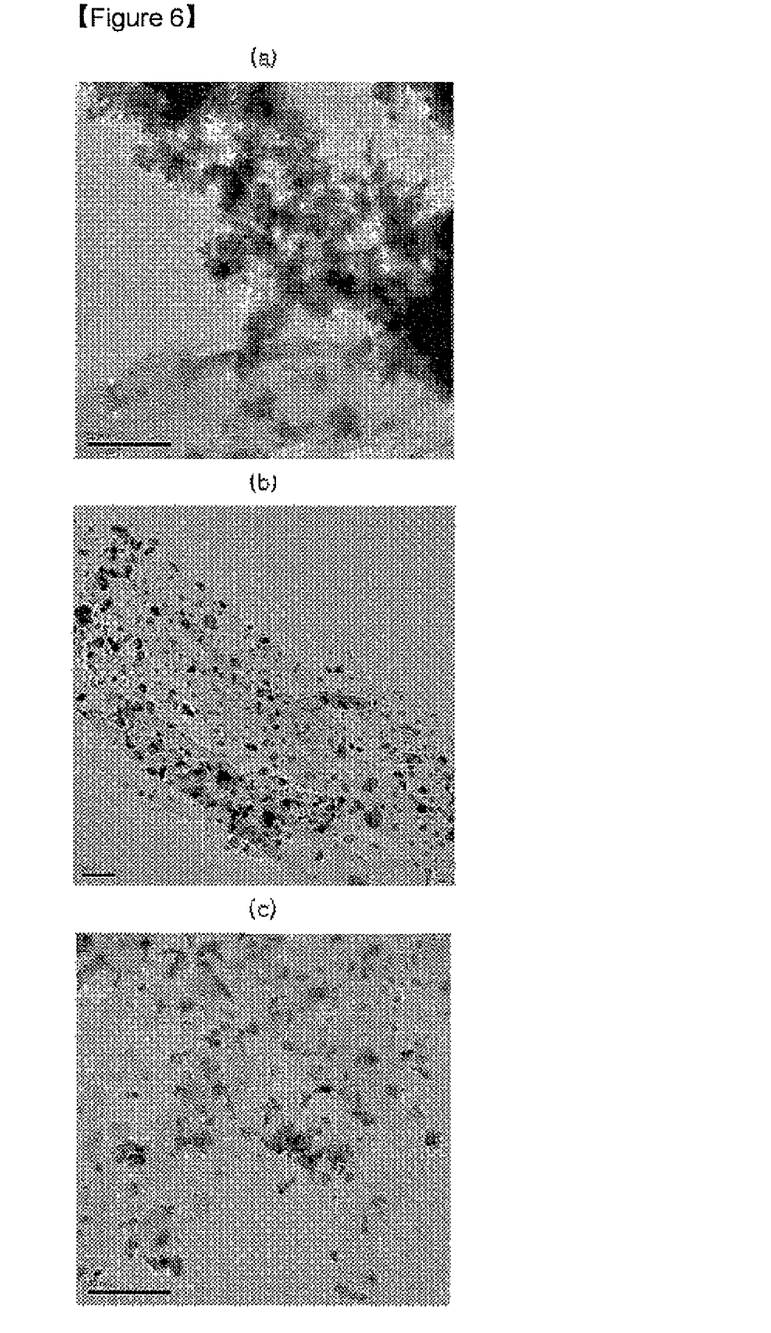

According to a result of analyzing a mass of the platinum catalyst supported in the CNT using the MS, it can be appreciated that a weight ratio of carbon and platinum is 6.1:3.9. It shows that the weight ratio of platinum is lower than the embodiments 1, 2, 3, 4, 5, and 6. FIG. 6(a) is a transmission electron microscope (TEM) photograph showing non-uniformly supported platinum particles with non-uniform particle size, differently from the embodiments.

COMPARISON EXAMPLE 2

The platinum catalyst supported in the CNT is manufactured according to the known document (Kim et al., J. Colloid and Interface Science, 297, 2006, 365). The CNT support of 2 g prepared according to the same process as the embodiment 1 is injected in ultrapure water of 11 L and is dispersed in the agitator for one hour. Hexachloroplatinate salt ($H_2PtCl_6H_2O$) added in a separate reactor to make a weight ratio of carbon and platinum 6:4 are injected in the ultrapure water of 1 L without injecting surfactant and is agitated for one hour to manufacture a solution. This solution is injected in a solution in which the CNT support is dispersed and when ethanol solution (ultrapure water:ethanol=3:1) of 4 L as a reducing agent is injected and a temperature is slowly raised to 50° C., is reacted for one hour in a state where the high output ultrasonic wave oscillator and the agitator are concurrently operated. Thereafter, it is agitated for one hour after the temperature of the reactor is raised to 100° C. and it is cooled by putting into ice water after the reaction is completed. The solution is repetitively filtered with ultrapure water until ion conductivity of residual solution is 1 µS or less, using a membrane filter (product available from Pall Corp.) of 1 µm or less. Then, the cleaned sample is dried for 12 hours in a vacuum oven operated at 85° C. and is further reduced for one hour under a hydrogen atmosphere of 300° C. and is then classified using a sieve so that the platinum catalyst supported in the CNT is obtained.

According to a result of analyzing a mass of the platinum catalyst supported in the CNT using the MS, it can be appreciated that a weight ratio of carbon and platinum is 5.8:4.2. It shows that the weight ratio of platinum is approximately similar to the embodiments 1, 2, 3, 4, 5, and 6. FIG. 6(b) is a transmission electron microscope (TEM) photograph showing non-uniformly supported platinum particles with non-uniform particle size, in some cases 10 nm or more, differently from the embodiments.

COMPARISON EXAMPLE 3

The platinum catalyst supported in the CNT is manufactured according to the known document (Sung et al., J. Electrchem. Soc., 153(10), 2006, A1812). The CNT support of 2 g prepared according to the same process as the embodiment 1 is injected in ultrapure water of 11 L and is dispersed in the agitator for one hour. Hexachloroplatinate salt ($H_2PtCl_6H_2O$) added in a separate reactor to make a weight ratio of carbon and platinum 6:4 are injected in the ultrapure water of 1 L without injecting surfactant and is agitated for one hour. This solution is injected in a solution in which the CNT support is dispersed and is agitated for one hour in an ice bath. Thereafter, $NaBH_4$ solution of 0.1 M is injected to support the platinum catalyst. After the reaction is completed, the solution is repetitively filtered with ultrapure water until ion conductivity of residual solution is 1 µS or less using a membrane filter (product available from Pall Corp.) of 1 µm or less. Then, the cleaned sample is dried for 12 hours in a vacuum oven operated at 85° C. and is classified using a sieve so that the platinum catalyst supported in the CNT is obtained.

According to a result of analyzing a mass of the platinum catalyst supported in the CNT using the MS, it can be appreciated that a weight ratio of carbon and platinum is 6.1:3.9. It shows that the weight ratio of platinum is lower as compared to the embodiments 1, 2, 3, 4, 5, and 6. FIG. 6(c) is a transmission electron microscope (TEM) photograph showing non-uniformly supported platinum particles with non-uniform particle size, differently from the embodiments.

Briefly describing the form and supported amount of metal particles from the embodiments and the comparison examples, in the support catalysts manufactured according to the embodiments 1, 2, 3, 4, 5, and 6, the metal particles are uniformly supported on the surface of the support at a size of 5 nm or less, while in the support catalysts manufactured according to the comparison examples 1, 2, and 3, the metal particles is non-uniformly supported and has a non-uniform size as well as the supported amount of metals is small.

Figure 7:
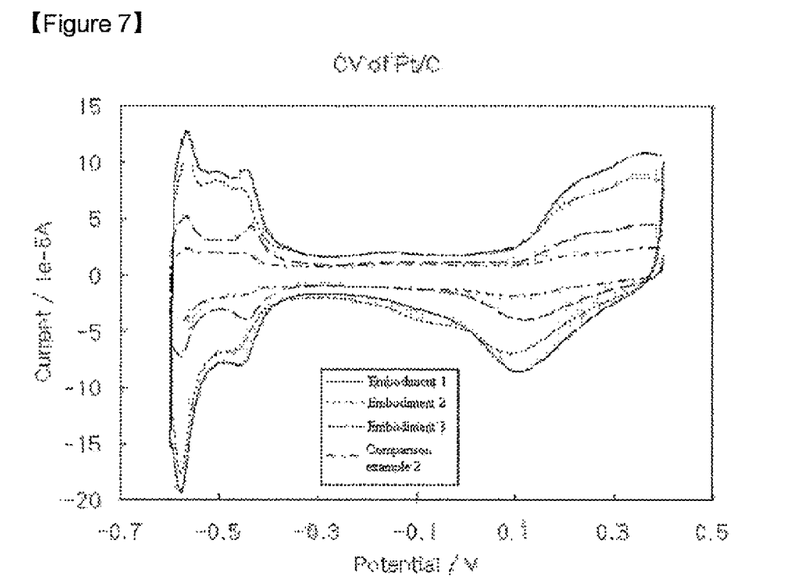
FIG. 7 is a graph of cyclovoltamogram showing the platinum catalyst manufactured according to the embodiments 1, 2, 3, the platinum catalyst according to the comparison example 2, and electrochemical characteristics of commercial product.

FIG. 7 is a graph of cyclovoltamograms each corresponding to measurements of the specific surface areas of the catalyst manufactured according to the embodiments 1, 2, and 3 and the catalyst manufactured according to the comparison example 2 having the supported amount of platinum similar to the embodiments 1, 2, and 3 using an electrochemical method. Even although the supported amount of metal particles is approximately the same, since the catalysts according the comparison examples have a non-uniform and large particle, the adsorption and desorption peaks of hydrogen are obscure and in the case of the embodiments 1, 2, 3, the measured specific surface area is 128 $m^2/g$, 99 $m^2/g$, and 65 $m^2/g$, while in the case of comparison examples, it is 56 $m^2/g$.

Figure 8:
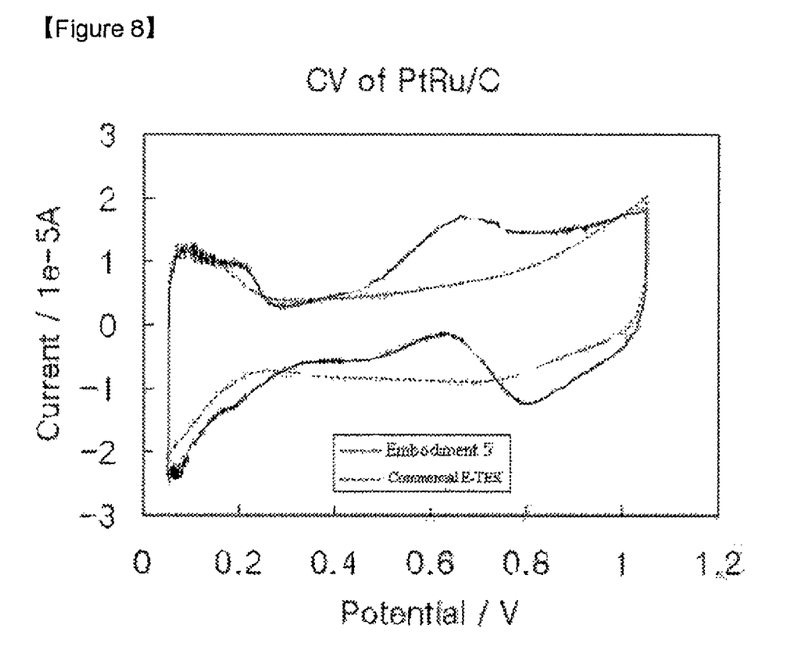
FIG. 8 is a graph of cyclovoltamogram showing the platinum/ruthenium catalyst manufactured according to the embodiments 4 and the electrochemical characteristics of commercial product.

FIG. 8 is a graph of cyclovoltamograms for the catalyst manufactured according to the embodiment 4 and a commercial product (E-TEK, 50 wt %, Pt:Ru=1:1) where a weight ratio of platinum/ruthenium is similar to a weight ratio of metal powders of combined carbon, platinum, and ruthenium. Even although the supported amount of metal particles is approximately the same, in the case of the commercial product the adsorption and desorption peaks of hydrogen are obscure Therefore, it can be appreciated that the electrochemical characteristics of the catalysts in the CNT support manufactured according to the embodiments are better.

[Industrial Applicability]

As described above, the present invention is more environmental friendly and economical as well as can uniformly support a large amount of metal nano particles irrespective of a kind of metal, as compared to the prior art, so that it can provide electrochemical catalysts for a polymer electrolyte fuel cell with more improved electrochemical characteristics than the prior art as well as the commercial product.

The invention claimed is:

1. A process for the preparation of electrochemical catalysts of fuel cells based on polymer electrolytes to uniformly disperse metal particles in a support, the process including the steps of:
   A) injecting a carbon support and a solvent into a first reactor installed with a high output ultrasonic wave oscillator and an agitator;
   B) dispersing the carbon support into a primary particle level using a high output ultrasonic wave, thereby maximizing a specific surface area of the carbon support;
   C) preparing a precursor solution formed with a micelle containing precursor ions by adding a surfactant and an aqueous solution having dissolved metal precursor to a second reactor;
   D) injecting the precursor solution manufactured in step C) into the dispersion of step B) while the high output ultrasonic wave oscillator and the agitator are concurrently operating and allowing the micelle to be adsorbed on the surface of the carbon support;
   E) forming nuclei of metal particles by injecting a reducing agent at 30 to 70° C. into a mixture of precursor solution and dispersion recited in step D) while the high output ultrasonic wave oscillator and the agitator are concurrently operating;
   F) stopping the high output ultrasonic wave and growing the size of metal particles to 2 to 5 nm by raising a temperature up to 80 to 100° C.;
   G) rapid cooling the metal particles;

H) cleaning the micelle surrounding the metal particles; and

I) drying the metal particles, wherein the metal particles are uniformly supported on a surface of the carbon support and have high catalyst activity.

2. The process according to claim 1, wherein the high output ultrasonic wave uses high output ultrasonic wave of 20 Khz or more and 600 W or more.

3. The process according to claim 1, wherein the support used is at least one of carbon black, activation carbon, carbon nanotube, carbon nanofiber, carbon nanohorn, or carbon ball.

4. The process according to claim 1, wherein the solvent is at least one of water, methanol, ethanol, propanol, tetrahydrofuran, acetone, benzene, or toluene.

5. The process according to claim 1, wherein the metal precursor is at least one of chloride, salt oxide, acetyl acetone compound, ammonium salt, bromide platinum, ruthenium, palladium, gold, iridium, rhenium, iron, nickel, cobalt, tungsten, molybdenum, or alloys thereof.

6. The process according to claim 1, wherein the surfactant used is a sulfonate-based surfactant.

7. The process according to claim 6, wherein the surfactant used is 0.1 to 1 parts by weight for 100 parts by weight of the support.

8. The process according to claim 1, wherein the reducing agent is at least one of alcohol, hydrazine aqueous solution, formaldehyde aqueous solution, sodium borohydride aqueous solution, or hydrogen gas.

9. The process according to claim 1, wherein upon cleaning in the step F), the metal particles are filtered and cleaned to make the ion conductivity 1 μS or less using alcohol, water or a mixed liquid thereof.

10. The process according to claim 1, wherein upon cleaning in the step F), the process further includes removing unreacted metal precursors by any one of desalting methods of dialysis, electrodialysis, ion exchange, and ultrafiltration.

11. The process according to claim 1, wherein the drying method used involves exposure to a vacuum oven with a temperature of 80 to 120° C., a reduction treatment, a spray dry, or a freeze dry.

* * * * *